United States Patent
Antchak et al.

(10) Patent No.: US 10,876,605 B2
(45) Date of Patent: Dec. 29, 2020

(54) ENDLESS DRIVE ARRANGEMENT FOR HYBRID VEHICLE USING TWO-ARMED TENSIONER WITH NON-ORBITING ARMS

(71) Applicant: LITENS AUTOMOTIVE PARTNERSHIP, Woodbridge (CA)

(72) Inventors: John R. Antchak, Aurora (CA); Geoffrey W. Ryeland, North York (CA); Ron Farewell, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 578 days.

(21) Appl. No.: 15/545,808

(22) PCT Filed: Feb. 8, 2016

(86) PCT No.: PCT/CA2016/050113
§ 371 (c)(1),
(2) Date: Jul. 24, 2017

(87) PCT Pub. No.: WO2016/123723
PCT Pub. Date: Aug. 11, 2016

(65) Prior Publication Data
US 2018/0017143 A1    Jan. 18, 2018

Related U.S. Application Data

(60) Provisional application No. 62/113,302, filed on Feb. 6, 2015.

(30) Foreign Application Priority Data

Oct. 21, 2015   (WO) ................ PCT/CA2015/051067

(51) Int. Cl.
*F16H 7/12*   (2006.01)
*F16H 7/08*   (2006.01)
(Continued)

(52) U.S. Cl.
CPC .......... *F16H 7/1218* (2013.01); *B60K 6/485* (2013.01); *B60K 6/50* (2013.01); *B60K 25/02* (2013.01);
(Continued)

(58) Field of Classification Search
CPC .......... F02B 67/06; B60K 6/485; B60K 6/50; B60K 25/02
See application file for complete search history.

(56) References Cited

U.S. PATENT DOCUMENTS

| | | | |
|---|---|---|---|
| 315,735 A | 4/1885 | Colburn | |
| 976,115 A | 11/1910 | Bard | |

(Continued)

FOREIGN PATENT DOCUMENTS

| | | |
|---|---|---|
| CA | 2910627 A1 | 4/2016 |
| CN | 1802525 A | 7/2006 |

(Continued)

OTHER PUBLICATIONS

International Search Report and Written Opinion for PCT/CA2017050954 dated Nov. 9, 2017.

(Continued)

*Primary Examiner* — Michael R Mansen
*Assistant Examiner* — Mark K Buse
(74) *Attorney, Agent, or Firm* — Millman IP Inc.

(57) ABSTRACT

In an aspect, a tensioner is provided for tensioning a belt and includes first and second tensioner arms having first and second pulleys respectively. The first and second pulleys are configured for engagement with first and second belt spans, and are biased in first and second free arm directions respectively. A second tensioner arm stop is positioned to limit the movement of the second tensioner arm in a direction opposite the second free arm direction. The second tensioner arm stop is positioned such that, in use, the second (Continued)

pulley is engaged with the endless drive member while the second tensioner arm is engaged with the second tensioner arm stop throughout a first selected range of operating conditions.

13 Claims, 6 Drawing Sheets

(51) Int. Cl.
| | | |
|---|---|---|
| *B60K 25/02* | (2006.01) | |
| *F02B 67/06* | (2006.01) | |
| *B60K 6/485* | (2007.10) | |
| *B60K 6/50* | (2007.10) | |
| *B60K 6/26* | (2007.10) | |

(52) U.S. Cl.
CPC ........... *F02B 67/06* (2013.01); *F16H 7/0831* (2013.01); *F16H 7/12* (2013.01); *F16H 7/1227* (2013.01); *B60K 2006/268* (2013.01); *B60K 2025/022* (2013.01); *F16H 2007/0806* (2013.01); *F16H 2007/0808* (2013.01); *F16H 2007/0865* (2013.01); *F16H 2007/0874* (2013.01); *F16H 2007/0893* (2013.01)

(56) References Cited

U.S. PATENT DOCUMENTS

| | | |
|---|---|---|
| 1,805,326 A | 5/1931 | Bunker et al. |
| 1,848,423 A | 3/1932 | Jackson |
| 1,871,268 A | 8/1932 | Hildebrand |
| 2,066,721 A | 1/1937 | Eaton |
| 2,425,476 A | 8/1947 | Lade et al. |
| 2,639,623 A | 5/1953 | Ausherman |
| 2,766,417 A | 10/1956 | Merritt |
| 2,875,842 A | 3/1959 | Morrell |
| 2,945,393 A | 7/1960 | Paulson |
| 2,954,726 A | 10/1960 | Kerridge |
| 3,575,058 A | 4/1971 | Kraus |
| RE27,861 E | 1/1974 | Kraus |
| 4,511,348 A | 4/1985 | Witdoek et al. |
| 4,564,098 A | 1/1986 | Hormann |
| 4,758,208 A | 7/1988 | Bartos et al. |
| 5,435,100 A | 7/1995 | Kuisis |
| 5,776,025 A | 7/1998 | Labudde et al. |
| 6,511,393 B1 * | 1/2003 | Bogl ................. F01L 1/024 474/101 |
| 6,609,989 B2 | 8/2003 | Bogner et al. |
| 6,648,783 B1 | 11/2003 | Bogner |
| 6,689,001 B2 | 2/2004 | Oliver et al. |
| 6,821,223 B2 | 11/2004 | Henry |
| 6,830,524 B2 | 12/2004 | Tamai |
| 6,942,589 B2 | 9/2005 | Rogers |
| 6,960,145 B2 | 11/2005 | Fraley, Jr. et al. |
| 7,032,349 B2 | 4/2006 | Oberheide et al. |
| 7,419,447 B2 | 9/2008 | Serkh |
| 7,468,013 B2 | 12/2008 | Di Giacomo et al. |
| 7,494,434 B2 | 2/2009 | McVicar et al. |
| 7,648,436 B2 | 1/2010 | Horst et al. |
| 7,699,731 B2 | 4/2010 | Bicchi et al. |
| 7,892,125 B2 | 2/2011 | Nelson et al. |
| 7,901,310 B2 | 3/2011 | Lolli et al. |
| 8,353,795 B2 | 1/2013 | Montani et al. |
| 8,439,780 B2 | 5/2013 | Ruffini et al. |
| 8,591,358 B2 | 11/2013 | Fischer |
| 8,602,930 B2 | 12/2013 | Deneszczuk et al. |
| 8,821,328 B2 | 11/2014 | Jud et al. |
| 9,097,314 B2 | 8/2015 | Wolf et al. |
| 9,133,762 B2 | 9/2015 | Macguire et al. |
| 9,151,366 B2 | 10/2015 | Antchak et al. |
| 9,341,243 B2 | 5/2016 | Replete et al. |
| 9,528,576 B2 | 12/2016 | Anstey et al. |
| 2002/0039943 A1 | 4/2002 | Serkh |
| 2002/0086751 A1 | 7/2002 | Bogner et al. |
| 2003/0109342 A1 * | 6/2003 | Oliver ................. F16H 7/1281 474/134 |
| 2003/0153421 A1 | 8/2003 | Liu |
| 2003/0216203 A1 * | 11/2003 | Oliver ................. F16H 7/1281 474/134 |
| 2004/0043854 A1 | 3/2004 | Fraley et al. |
| 2004/0072642 A1 | 4/2004 | Serkh |
| 2004/0077446 A1 * | 4/2004 | Manning ............... F16H 7/1281 474/134 |
| 2006/0100051 A1 | 5/2006 | Di Giacomo et al. |
| 2006/0217222 A1 * | 9/2006 | Lolli ..................... F16H 7/1281 474/134 |
| 2006/0287146 A1 | 12/2006 | McVicar et al. |
| 2007/0037648 A1 | 2/2007 | Di Giacomo et al. |
| 2007/0155559 A1 | 7/2007 | Horst et al. |
| 2008/0214342 A1 | 9/2008 | Montani et al. |
| 2009/0069134 A1 | 3/2009 | Kuo |
| 2009/0298631 A1 | 12/2009 | Jud et al. |
| 2011/0070986 A1 | 3/2011 | Maguire et al. |
| 2013/0040770 A1 | 2/2013 | Wolf et al. |
| 2013/0079185 A1 | 3/2013 | Schauerte et al. |
| 2013/0172137 A1 * | 7/2013 | Antchak ................ B60K 25/02 474/133 |
| 2013/0260932 A1 | 10/2013 | Adam et al. |
| 2014/0256488 A1 * | 9/2014 | Wolf .................... F16H 7/1281 474/135 |
| 2014/0315673 A1 * | 10/2014 | Zacker ................. F16H 7/1218 474/135 |
| 2015/0051033 A1 | 2/2015 | Replete et al. |
| 2015/0060232 A1 | 3/2015 | Tran et al. |
| 2015/0167797 A1 | 6/2015 | Noguchi et al. |
| 2015/0345597 A1 * | 12/2015 | Walter ................... B60K 25/00 474/134 |
| 2015/0369347 A1 | 12/2015 | Wolf et al. |
| 2017/0074375 A1 * | 3/2017 | Ryeland ............... F16H 7/1281 |
| 2017/0306836 A1 * | 10/2017 | Replete ................. F02B 67/06 |
| 2017/0363182 A1 * | 12/2017 | Ryeland ............... F16H 7/1281 |

FOREIGN PATENT DOCUMENTS

| | | |
|---|---|---|
| CN | 102022495 A | 4/2011 |
| CN | 102954167 A | 3/2013 |
| CN | 104220780 A | 12/2014 |
| DE | 19849659 A1 | 5/2000 |
| DE | 102005039719 A1 | 3/2007 |
| DE | 202008002279 U1 | 6/2008 |
| DE | 102007042501 A1 | 3/2009 |
| DE | 102013203957 B3 | 2/2014 |
| DE | 102013206010 B3 | 8/2014 |
| DE | 102013005884 A1 | 10/2014 |
| DE | 102015205804 A1 | 10/2015 |
| EP | 2128489 B1 | 8/2011 |
| EP | 2557295 A2 | 2/2013 |
| WO | 2001079727 A2 | 10/2001 |
| WO | 2004059192 A1 | 7/2004 |
| WO | 2004099650 A1 | 11/2004 |
| WO | 2012061930 A1 | 5/2012 |
| WO | 2013142951 A1 | 10/2013 |
| WO | 2013159181 A1 | 10/2013 |
| WO | 2014100894 A1 | 7/2014 |
| WO | 2015027325 A1 | 3/2015 |
| WO | 2015070329 A1 | 5/2015 |
| WO | 2016061685 A1 | 4/2016 |
| WO | 2016132054 A1 | 8/2016 |

OTHER PUBLICATIONS

Office Action for U.S. Appl. No. 15/696,994 dated Sep. 30, 2019.
Extended European Search Report for PCT/CA2015/051067 dated Apr. 30, 2018.
EP Search Report for EP Application No. 17805447.4 dated Nov. 4, 2019.
Arc Spring Alternator Mounted Tensioner—Feb. 15, 2015.
Cellasto Components Complete Industrial Products (Brochure) dated Apr. 10, 2015, BASF (http://www.polyurethanes.basf.com/pu/Cellasto/ ).

(56) References Cited

OTHER PUBLICATIONS

Dynamics and Stability of Mechanical Systems with Follower Forces, Nov. 1971, George Hermann (Standford University, NASA).
International Search Report and Written Opinion for PCT/CA2017050660 dated Sep. 15, 2017.
ISR and WO for PCT/CA2016/050113 dated Apr. 18, 2016.
ISR and WO for PCT/CA2015/051067 dated Feb. 3, 2016.
EP2557295—English translation.
Office Action for CN201580057155 dated Dec. 3, 2018.
Office Action for CN201580057155 dated Dec. 3, 2018—English translation.
Office Action for CN201680008671 dated Jan. 24, 2019.
Office Action for CN201680008671 dated Jan. 24, 2019—English translation.
Extended European Search Report for PCT/CA2016/050113 dated Sep. 11, 2018.
Final Office Action for U.S. Appl. No. 15/696,994 dated Apr. 1, 2020.
EESR for EP17838270.1 dated Jun. 19, 2020.

* cited by examiner

ENDLESS DRIVE ARRANGEMENT FOR HYBRID VEHICLE USING TWO-ARMED TENSIONER WITH NON-ORBITING ARMS

CROSS-REFERENCE TO RELATED APPLICATIONS

This application claims the benefit of U.S. Provisional Patent Application No. 62/113,302 filed Feb. 6, 2015 and PCT Application No. CA2015/051067 filed Oct. 21, 2015, the contents of both of which are incorporated herein in their entirety.

FIELD

This disclosure relates generally to the art of endless drive arrangements, and more particularly to systems for vehicular front engine accessory drive arrangements that include a motor/generator unit in addition to an internal combustion engine.

BACKGROUND

Vehicular engines typically employ a front engine accessory drive, which uses a belt to transfer power from the engine to one or more accessories, such as an alternator, an air conditioner compressor, a water pump and various other accessories. Some vehicles are hybrids and employ both an internal combustion engine which drives the belt, and an auxiliary power device such as a motor-generator unit (MGU) instead of the alternator, or such as a separate electric drive motor in addition to an alternator. In certain situations, the auxiliary power device is used to drive the belt, such as, for example, during a boost event where power is transferred to the engine by the auxiliary power device through the belt.

While hybrid vehicles are advantageous in terms of improved fuel economy, their operation can result in higher stresses and different stresses on certain components such as the belt from the front engine accessory drive, which can lead to a reduction in the operating life of these components.

Tensioning the belt in a hybrid vehicle can be difficult, particularly in some of today's vehicles where there is relatively little room for the tensioner. Attention has been given in recent years to mounting a tensioner onto the MGU itself so as to tension the belt spans immediately upstream from and downstream from the MGU, in order to ensure that the appropriate span is tensioned regardless of whether the MGU is driving the belt or whether the engine is driving the belt.

Such tensioners, however, do not always perform as desired. It would be advantageous to provide a tensioner and an endless drive arrangement that incorporates such a tensioner, with improved performance compared to at least tensioners that have been proposed in the past, for the front engine accessory drive in a hybrid vehicle.

SUMMARY

In an aspect, an endless drive arrangement is provided and includes a crankshaft pulley that is driveable by an engine, an auxiliary power device, an endless drive member and a tensioner. The auxiliary power device has an auxiliary power device pulley that is rotatable about an auxiliary power device pulley axis. The auxiliary power device pulley is provided on an auxiliary power device drive shaft that extends from an end-face of the auxiliary power device, wherein the end-face is part of a frame for the auxiliary power device. The endless drive member extends about the crankshaft pulley and the auxiliary power device pulley. The tensioner includes a base that is mountable to a frame of the auxiliary power device, a first arm, a second arm and an arm biasing member. The first arm has a first tensioner pulley positioned to engage a first span of the endless drive member. The first arm is pivotally mounted to the base at a first arm pivot structure on a first side of the auxiliary power device pulley to cause movement of the first tensioner pulley along a first selected path over a selected range of tensions in the first span ranging from a low tension of 100N to a high tension that is equal to a yield strength of the endless drive member. The second arm has a second tensioner pulley positioned to engage a second span of the endless drive member. The second arm is pivotally mounted to the base at a second arm pivot structure on a second side of the auxiliary power device pulley arm to cause movement of the second tensioner pulley along a second selected path over a selected range of tensions in the second span ranging from a low tension of 100N to a high tension that is equal to the yield strength of the endless drive member. The arm biasing member operatively connecting the first arm and the second arm to one another. The first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another. The first and second arm pivot structures are within an area of the end-face of the auxiliary power device from which the auxiliary power device drive shaft extends. In another aspect, the tensioner itself is provided without the rest of the endless drive arrangement.

In another aspect, an endless drive arrangement is provided and includes a crankshaft pulley that is driveable by an engine, an auxiliary power device, an endless drive member and a tensioner. The auxiliary power device has an auxiliary power device pulley that is rotatable about an auxiliary power device pulley axis. The auxiliary power device pulley is provided on an auxiliary power device drive shaft that extends from an end-face of the auxiliary power device, wherein the end-face is part of a frame for the auxiliary power device. The endless drive member extends about the crankshaft pulley and the auxiliary power device pulley. The tensioner includes a base that is mountable to a frame of the auxiliary power device, a first arm, a second arm and an arm biasing member. The first arm has a first tensioner pulley positioned to engage a first span of the endless drive member. The first arm is pivotally mounted to the base at a first arm pivot structure on a first side of the auxiliary power device pulley to cause movement of the first tensioner pulley along a first selected path over a selected range of tensions in the first span ranging from a low tension of 100N to a high tension that is equal to a yield strength of the endless drive member. The second arm has a second tensioner pulley positioned to engage a second span of the endless drive member. The second arm is pivotally mounted to the base at a second arm pivot structure on a second side of the auxiliary power device pulley arm to cause movement of the second tensioner pulley along a second selected path over a selected range of tensions in the second span ranging from a low tension of 100N to a high tension that is equal to the yield strength of the endless drive member. The arm biasing member operatively connecting the first arm and the second arm to one another. The first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another. The first tensioner pulley axis is spaced from the auxiliary power device pulley axis by a first pulley-pulley distance, and the second tensioner pulley axis is spaced from the auxiliary power device pulley axis by a second pulley-pulley distance. Substantially throughout movement along the first and second paths during operation, a ratio of the second pulley-pulley distance to the first pulley-pulley distance is between about 0.5 and about 0.85. In another aspect, the tensioner itself is provided without the rest of the endless drive arrangement.

In yet another aspect, an endless drive arrangement is provided and includes a crankshaft pulley that is driveable by an engine, an auxiliary power device, an endless drive member and a tensioner. The auxiliary power device has an auxiliary power device pulley that is rotatable about an auxiliary power device pulley axis. The auxiliary power device pulley is provided on an auxiliary power device drive shaft that extends from an end-face of the auxiliary power device, wherein the end-face is part of a frame for the auxiliary power device. The endless drive member extends about the crankshaft pulley and the auxiliary power device pulley. The tensioner includes a base that is mountable to a frame of the auxiliary power device, a first arm, a second arm and an arm biasing member. The first arm has a first tensioner pulley positioned to engage a first span of the endless drive member. The first arm is pivotally mounted to the base at a first arm pivot structure on a first side of the auxiliary power device pulley to cause movement of the first tensioner pulley along a first selected path over a selected range of tensions in the first span ranging from a low tension of 100N to a high tension that is equal to a yield strength of the endless drive member. The second arm has a second tensioner pulley positioned to engage a second span of the endless drive member. The second arm is pivotally mounted to the base at a second arm pivot structure on a second side of the auxiliary power device pulley arm to cause movement of the second tensioner pulley along a second selected path over a selected range of tensions in the second span ranging from a low tension of 100N to a high tension that is equal to the yield strength of the endless drive member. The arm biasing member operatively connecting the first arm and the second arm to one another. The first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another. The first arm and the second arm are positionable during use to hold the first and second spans in such a way that a radial line extending from the auxiliary power device pulley axis passes through the first and second spans. In another aspect, the tensioner itself is provided without the rest of the endless drive arrangement.

In yet another aspect, an endless drive arrangement is provided and includes a crankshaft pulley that is driveable by an engine, an auxiliary power device, an endless drive member and a tensioner. The auxiliary power device has an auxiliary power device pulley that is rotatable about an auxiliary power device pulley axis. The auxiliary power device pulley is provided on an auxiliary power device drive shaft that extends from an end-face of the auxiliary power device, wherein the end-face is part of a frame for the auxiliary power device. The endless drive member extends about the crankshaft pulley and the auxiliary power device pulley. The tensioner includes a base that is mountable to a frame of the auxiliary power device, a first arm, a second arm and an arm biasing member. The first arm has a first tensioner pulley positioned to engage a first span of the endless drive member. The first arm is pivotally mounted to the base at a first arm pivot structure on a first side of the auxiliary power device pulley to cause movement of the first tensioner pulley along a first selected path over a selected range of tensions in the first span ranging from a low tension of 100N to a high tension that is equal to a yield strength of the endless drive member. The second arm has a second tensioner pulley positioned to engage a second span of the endless drive member. The second arm is pivotally mounted to the base at a second arm pivot structure on a second side of the auxiliary power device pulley arm to cause movement of the second tensioner pulley along a second selected path over a selected range of tensions in the second span ranging from a low tension of 100N to a high tension that is equal to the yield strength of the endless drive member. The arm biasing member operatively connecting the first arm and the second arm to one another. The first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another. The first span is at a lower tension than the second span when the auxiliary power device is not supplying power to the engine via the endless drive member and wherein the second span is at a lower tension than the first span when the auxiliary power device is supplying power to the engine via the endless drive member. The first tensioner pulley axis is at a first arm pivot distance from a pivot axis of the first arm pivot structure. The second tensioner pulley axis is at a second arm pivot distance from a pivot axis of the second arm pivot structure. The first arm pivot distance is greater than the second arm pivot distance. In another aspect, the tensioner itself is provided without the rest of the endless drive arrangement.

In yet another embodiment, a tensioner is provided for maintaining tension in an endless drive member. The tensioner includes, a base, a first tensioner arm and a second tensioner arm. The base is generally C-shaped and is configured to mount to a housing of an accessory that is drivable by the endless drive member. The first tensioner arm has a first tensioner pulley rotatably mounted thereto. The first tensioner pulley is configured for engagement with a first span of the endless drive member. The first tensioner arm is pivotally mounted to the base and is biased for movement in a first free arm direction. The second tensioner arm that has a second tensioner pulley rotatably mounted thereto. The second tensioner pulley is configured for engagement with a second span of the endless drive member. The second tensioner arm is pivotally mounted to the base for movement along a second path and is biased for movement in a second free arm direction. The base has a mounting face that faces the housing of the accessory and an away face that is opposite the mounting face. At least one of the first and second tensioner arms extends outside of the base and wherein the pulley for said at least one of the first and second tensioner arms has an accessory-facing face and an arm-facing face that faces said at least one of the first and second tensioner arms. The accessory-facing face is axially closer to the accessory than the away face of the base.

In another aspect, a method of operating a tensioner is provided, comprising:

a) driving an endless drive member via an engine and operating an auxiliary power device in a regen mode via the endless drive member;

b) during step a), engaging a first span of the endless drive member on a first side of the auxiliary power device with a first tensioner arm of a tensioner and engaging a second span of the endless drive member on a second side of the auxiliary power device with a second tensioner arm of the tensioner, wherein the first and second tensioner arms are connected to a biasing structure;

c) switching from the regen mode to a mode in which the endless drive member is driven at least partially using the auxiliary power device; and d) during said switching in step c), moving the first and second tensioner arms, based on changes in tension in the first and second spans of the endless drive member, wherein the second tensioner arm is moved through a greater angular sweep than the first tensioner arm.

BRIEF DESCRIPTION OF THE DRAWINGS

The foregoing and other aspects of the invention will be better appreciated with reference to the attached drawings, wherein.

DETAILED DESCRIPTION OF EXAMPLE EMBODIMENTS

Figure 1:
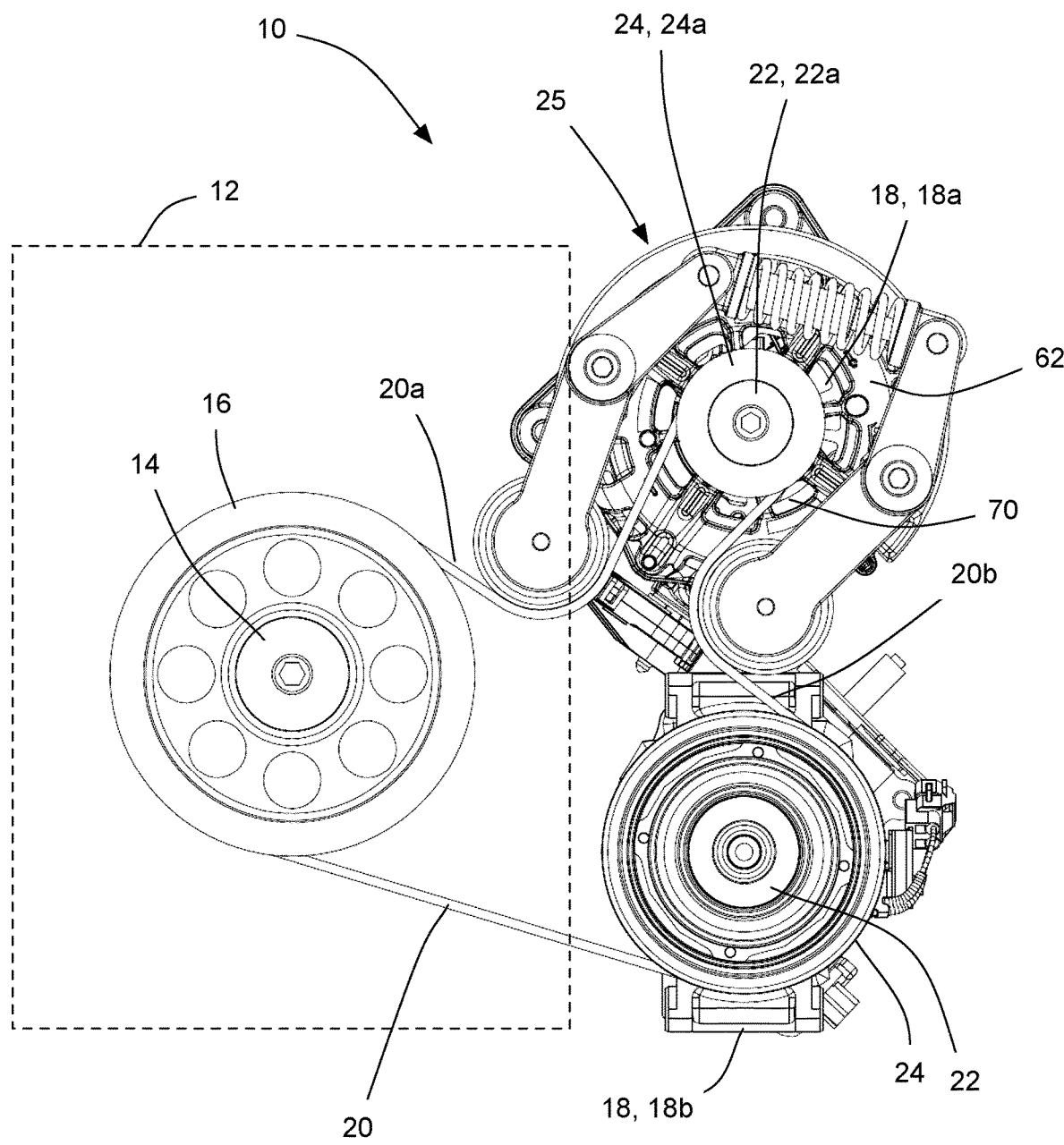
FIG. 1 is a plan view of an endless drive arrangement in accordance with inventive aspects of the disclosure.

FIG. 1 shows an endless drive arrangement 10 for an engine, schematically represented by a dashed-line rectangle and shown at 12. In embodiments wherein the engine 12 is mounted in a vehicle, the endless drive arrangement 10 may be a front engine accessory drive. The engine 12 includes a crankshaft 14 that has a crankshaft pulley 16 mounted thereon. The crankshaft pulley 16 is drivable by the crankshaft 14 of the engine 12 and itself drives one or more vehicle accessories 18 via an endless drive member 20, such as a belt. For convenience the endless drive member 20 will be referred to as a belt 20, however it will be understood that it could be any other type of endless drive member. The accessories 18 may include a motor-generator unit (MGU) 18a, an air conditioning compressor 18b, a water pump (not shown), a power steering pump (not shown) and/or any other suitable accessory. In the layout shown in FIG. 1, the crankshaft 14 may rotate clockwise during normal operation of the engine 12. However, in an alternative embodiment the engine 12 may be driven to rotate counterclockwise.

In FIG. 1, two accessories 18 are shown, however there could be more or fewer accessories. Each of the driven accessories has a drive shaft 22 and a pulley 24. The MGU 18a has an MGU drive shaft 22a and an MGU pulley 24a, which together rotate about an auxiliary power device pulley axis APDA.

As can be seen in FIG. 1, the belt 20 is engaged with the crankshaft pulley 16 and the MGU pulley 24a (and the other accessory pulleys 24). Under normal operating conditions the endless drive arrangement 10 is operable in a first mode in which the endless drive arrangement 10 may be driven by the engine 12, and in turn drives the pulleys 24 of the accessories 18. In the first mode, (i.e. when the MGU 18a is not supplying power to the engine 12 via the belt 20), the tension in the first belt span 20a is lower than the tension in the second belt span 20b. The MGU 18a may be operable to as an alternator in the first mode, in order to charge the vehicle's battery (not shown).

The MGU 18a is also operable as a motor, wherein it drives the MGU pulley 24a, which in turn drives the belt 20. During such events where the MGU 18a is operated as a motor (i.e. when the MGU 18a is supplying power to the engine 12 via the belt 20), the endless drive arrangement may be considered to be operable in a second mode, in which the tension in the second belt span 20b is lower than the tension in the first belt span 20a. This may be during a 'boost' event when the engine 12 is driving the wheels of the vehicle, but additional power is desired to supply further power to the wheels indirectly by transferring power to the engine's crankshaft 14 via the belt 20. Another situation in which the MGU 18a is operated as a motor include a BAS (Belt-Alternator Start) event, in which the MGU 18a drives the belt 20 in order to cause rotation of the crankshaft 14, and thereby start the engine 12. Yet another situation in which the MGU 18a is operated as a motor is an ISAF (Idle/Stop Accessory Function) event, when the MGU 18a is used to drive the belt 20 in order to drive one or more accessories when the engine is off (e.g. in some hybrid vehicles where the engine is turned off automatically when the vehicle is at a stoplight or is otherwise stopped briefly).

In the present disclosure, the span 20a of the belt 20 may be referred to at the first belt span 20a or the simply the first span 20a, and the span 20b of the belt 20 may be referred to as the second belt span 20b or simply the second span 20b.

It will be noted that the MGU 18a is but one example of an auxiliary power device that can be used as a motor to drive the belt 20 for any of the purposes ascribed above to the MGU 18a. In an alternative example, the accessory 18a may be a separate electric motor that may be provided adjacent to an alternator (either upstream or downstream on the belt 20 from the alternator), wherein the electric motor may be used for driving the belt 20 when it is desired to boost acceleration of the vehicle, in BAS operation, and/or in ISAF operation.

Figure 2:
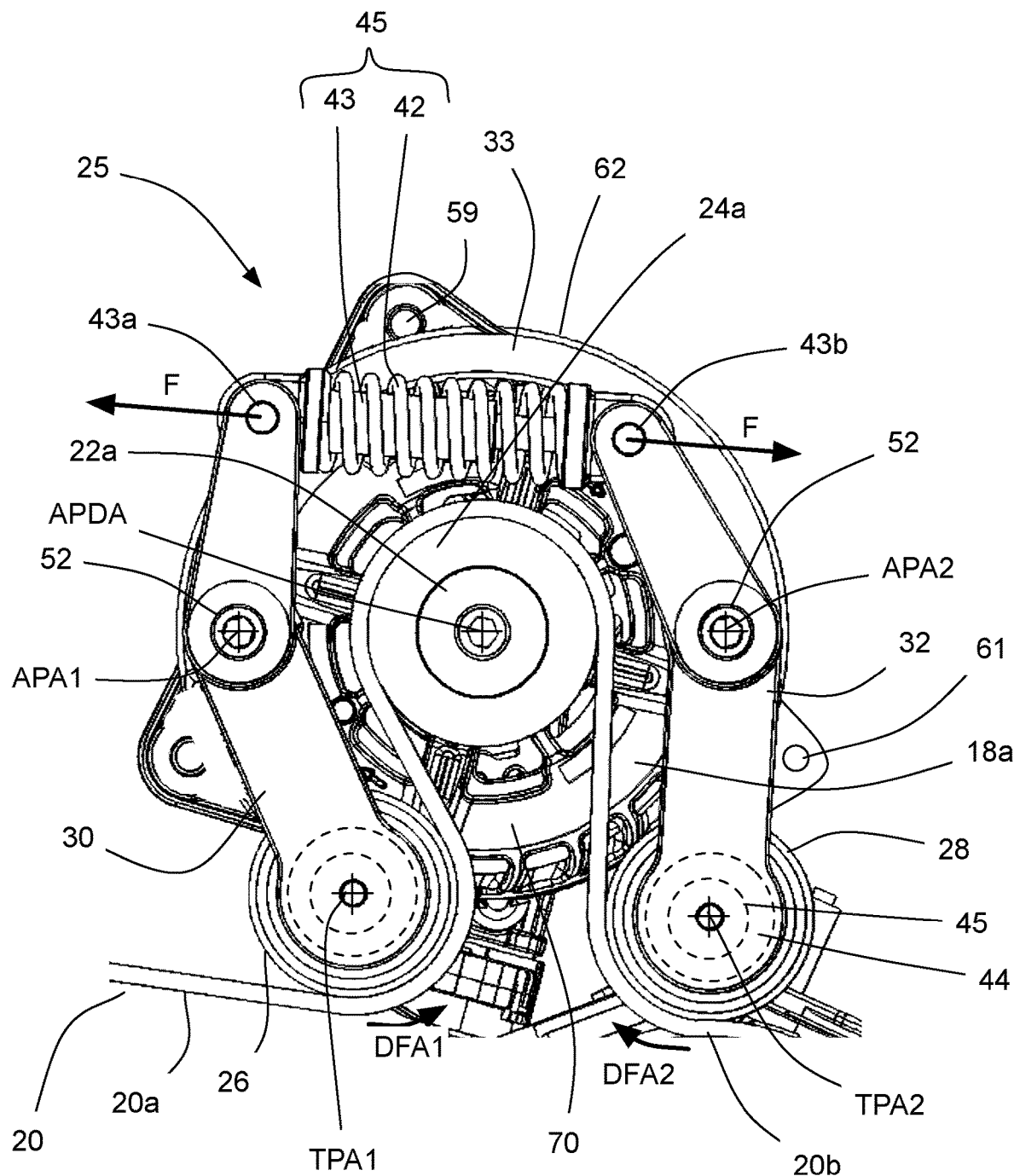
FIG. 2 is a plan view of a tensioner that is part of the endless drive arrangement shown in FIG. 1.
Figure 3:
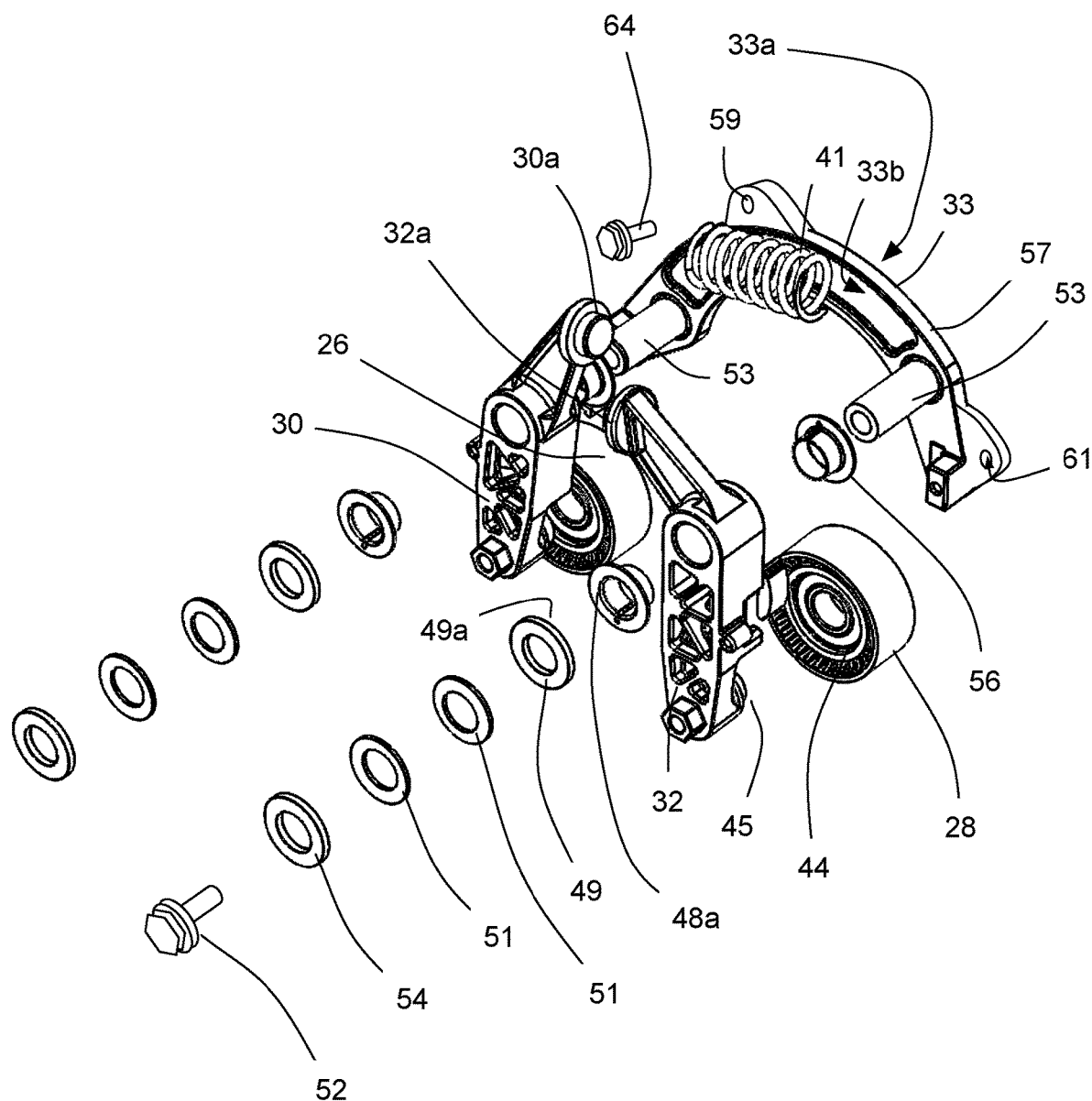
FIG. 3 is an exploded perspective view of a variant of the tensioner shown in FIG. 2.

A tensioner 25 for the endless drive arrangement 10 is shown in FIG. 1, and in more detail in FIGS. 2 and 3. The tensioner 25 includes a first tensioner pulley 26 that is configured for engagement with the first span 20a and a second tensioner pulley 28 that is configured for engagement with the second belt span 20b. The first tensioner pulley 26 is rotatably mounted on a first tensioner arm 30. The second tensioner pulley 28 is rotatably mounted on a second tensioner arm 32 (FIG. 1). The first and second tensioner arms 30 and 32 are each pivotably about respective first and second tensioner arm pivot axes APA1 and APA2. More specifically, the first and second tensioner arms 30 and 32 are mounted to a base 33 that mounts fixedly to the housing of the MGU 18a or any other suitable stationary member.

The first and second tensioner pulleys 26 and 28 are biased in first and second free arm directions (shown in FIG.

1 at DFA1 and DFA2 respectively). More specifically, a tensioner biasing member 41 may be positioned to apply a tensioner biasing force F on the first and second tensioner arms 30 and 32 in the respective first and second free arm directions DFA1 and DFA2.

The tensioner biasing member 41 may include a linear helical compression spring 42 that extends between the first and second tensioner arms 30 and 32 and a strut 43. In the example shown the helical compression spring 42 surrounds the strut 43 and engages drive surfaces on the strut 43. The strut 43 is pin jointed at its two ends 43a and 43b to the first and second tensioner arms 30 and 32, thereby enabling a spring force F to be transferred from the spring 42 into the arms 30 and 32. The strut 43 is extensible and contractible as needed to permit compression and extension of the helical compression spring 42. In some embodiments, the strut 43 can prevent buckling of the spring 42 to ensure that the spring 42 remains captured between the first and second arms 30 and 32. In an embodiment shown in FIG. 3, the helical compression spring 42 may directly engage end handles shown at 30a and 32a which directly form part of the first and second arms 30 and 32. In such an embodiment, no strut is provided because the spring 42 is made sufficiently strong to avoid buckling.

In an alternative embodiment, the tensioner biasing member 41 may include a leaf spring (not shown) that abuts first and second drive surfaces on the first and second tensioner arms 30 and 32 and urges the arms 30 and 32 to drive the first and second tensioner pulleys 26 and 28 into the belt 20. In yet another alternative embodiment, the tensioner biasing member 41 may be any other suitable type of biasing member.

The first and second tensioner pulleys 26 and 28 are rotatably mounted to the first and second tensioner arms 30 and 32 respectively, for rotation about first and second pulley rotation axes TPA1 and TPA2. In the example shown, each pulley 26 and 28 is mounted via a bearing 44 to a shaft 45 that extends from the respective arm 30 or 32.

In the embodiment shown in FIG. 2, the first tensioner arm pivot axis APA1 is positioned between the engagement point where the tensioner biasing member 41 applies the force F on the first tensioner arm 30 (i.e. the pin jointed end 43a of the strut 43), and the pulley rotation axis TPA1. Similarly, the second tensioner arm pivot axis APA2 is positioned between the engagement point where the tensioner biasing member 41 applies the force F on the second tensioner arm 30 (i.e. the pin jointed end 43b of the strut 43), and the pulley rotation axis TPA2. As a result, the spring force F urges the arms 30 and 32 to pivot about their pivot axes APA1 and APA2 to drive the pulleys 26 and 28 into the first and second belt spans 20a and 20b.

Optionally, as shown in FIG. 3, a damping structure 46 may be provided for each of the first and second tensioner arms 30 and 32. For example, the damping structure 46 for the arm 32 may include a first friction surface 48a that is provided on a first bushing member 48 and is configured to engage a corresponding second damping surface 49a on thrust member 49. A damping biasing structure 50 is provided as part of the damping structure 46, to drive engagement of the friction surfaces 48a and 49a with the damping surfaces of the arm 32 with a selected force that preferably remains at least generally constant as the bushing member 48 wears by some amount. The damping biasing structure 50 may include, for example, a plurality of Belleville washers 51, or any include any other suitable biasing member or members. A threaded fastener, such as a bolt with a washer (together shown at 52), passes through the damping biasing structure 50, the arm 32, through the base shaft 53 and into a receiving aperture on the MGU housing so as to retain the arm 32 on the base 33, while permitting pivotal movement of the arm 30. The fastener 52 engages a thrust member 54, which engages the Belleville washers 51. A second bushing member 56 is shown engaged with a second axial side of the arm 32. The damping structure may be similar to that which is shown in U.S. Pat. No. 8,591,358, the contents of which are incorporated herein in their entirety. It will be noted that the same damping structure may be provided for the arm 30 as is shown and described for the arm 32. However, it is optionally possible that the amount of damping that is provided may differ for the two arms 30 and 32. Any other suitable mounting structure to pivotally mount the arms 30 and 32 to the base 33 may be provided. Any other suitable damping structure may be provided.

It is optionally possible to provide the tensioner 25 in conjunction with an isolator (not shown) on the MGU drive shaft 22a.

Several features of the tensioner 25 may be advantageous and are described further below.

C-Shaped Base with Low Profile Based on Pulley Displacement

Figure 4:
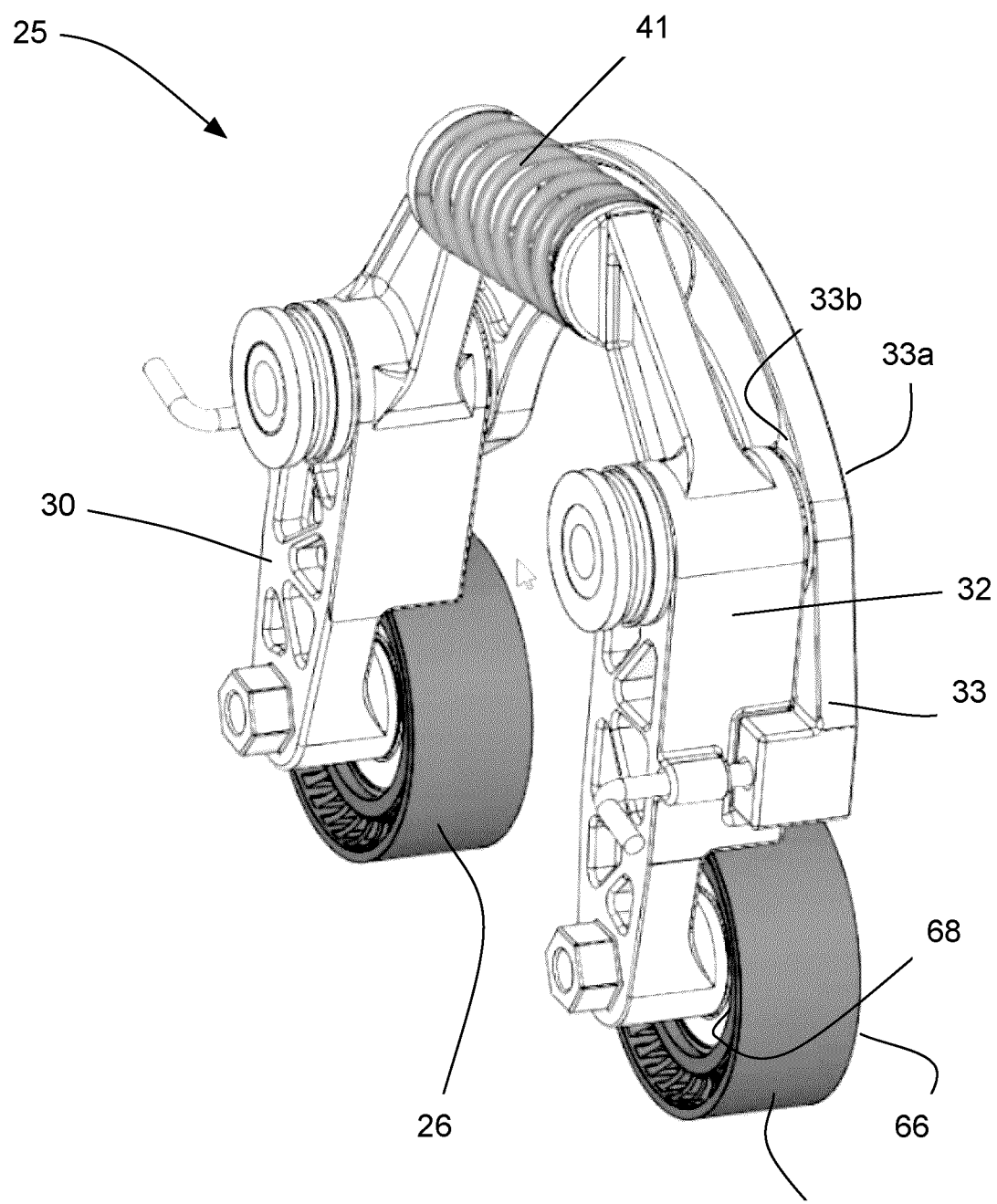
FIG. 4 is a perspective view of the variant of the tensioner shown in FIG. 3.

In an embodiment, the base 33 for the tensioner 25 may be generally C-shaped as shown in FIGS. 3 and 4. The base 33 has a base body 57, and first and second mounting apertures 59 and 61 which are configured for mounting the base 33 to corresponding apertures in the housing (shown at 62) of the MGU 18a or to another suitable member. The tensioner mounting fasteners 64 may be used to pass-through the apertures 59 and 61 and into corresponding threaded apertures in the MGU housing 62. Only one fastener 64 is shown, for aperture 59—however, it will be understood that another of the fastener 64 may be used for aperture 61. The base 33 has a mounting face 33a that faces the housing of the accessory and an away face 33b that is opposite the mounting face 33a. At least one of the first and second tensioner arms 30 and 32 (both in the present case) extends outside of the base 33. The pulley 26, 28 for the at least one of the first and second tensioner arms 30, 32 has an accessory-facing face 66 that faces the accessory (i.e. the auxiliary power device 18a) and an arm-facing face 68 that faces said at least one of the first and second tensioner arms 30, 32. It will be that the accessory-facing face 66 is axially closer to the accessory housing (i.e. the MGU 18a) than the away face 33b of the base 33. Optionally, the accessory-facing face 66 of each pulley 26, 28 is spaced axially farther from the away face 33b of the base 33 than is the mounting face of the base from the away face 33b of the base 33. In other words, the plane of the accessory-facing face 66 of the pulley 26, 28 may be axially below the plane of the accessory-facing face 33a of the tensioner 30 and 32 in some embodiments.

By making the base 33 C-shaped and by arranging the pulleys 26 and 28 as described above, it is possible to obtain a low profile for the tensioner 25 such that the tensioner 25 can fit in certain engine arrangements where space is tight.

Arms Configured so that the Belt Spans Never Interfere with One Another

Figure 5:
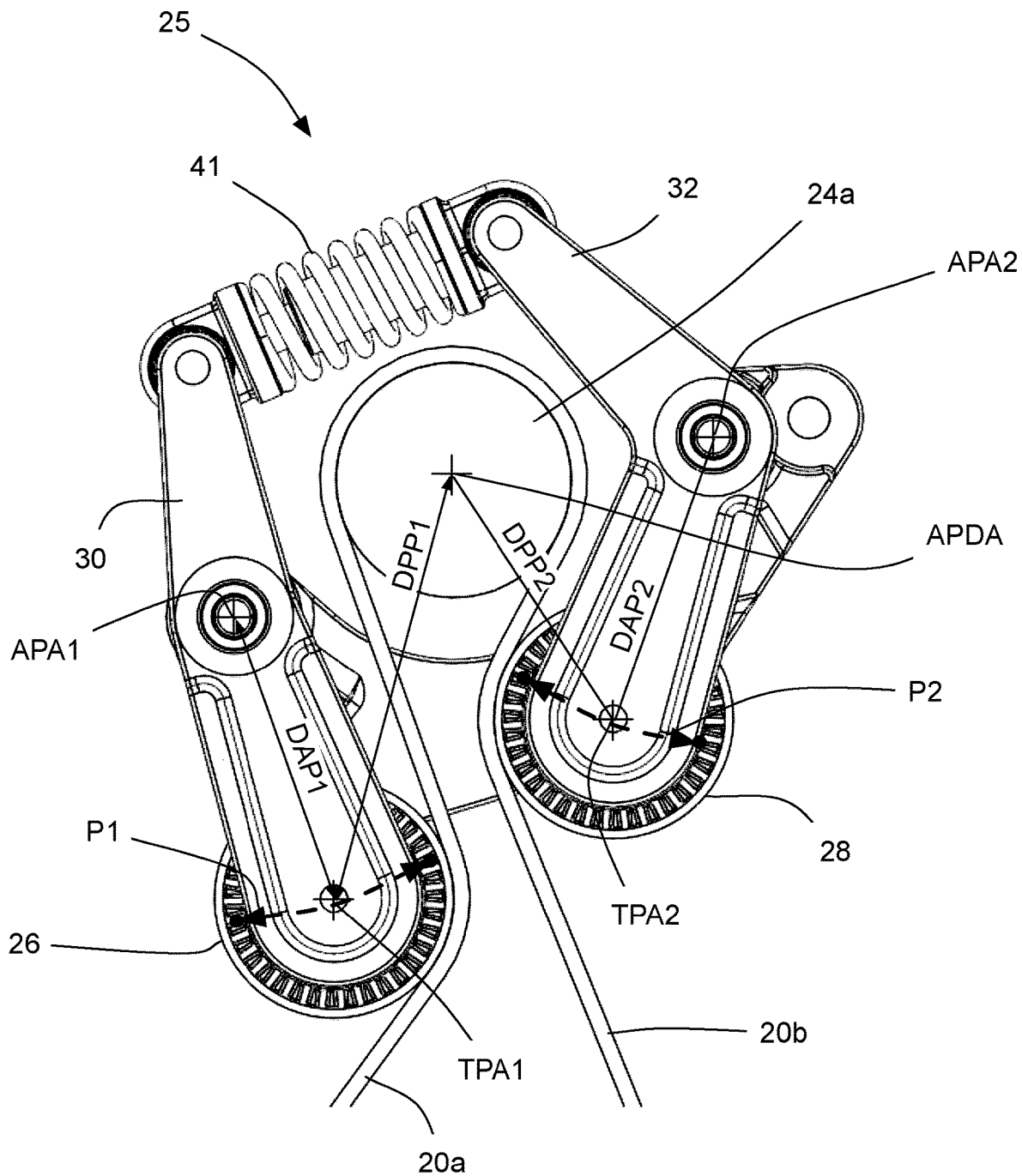
FIG. 5 is a plan view of another variant of the tensioner shown in FIG. 2.

An example of the tensioner 25 is shown in FIG. 5. In the example shown in FIG. 5, an arcuate path P1 is shown for the first pulley 26. The arcuate path P1 represents the path of movement of the first tensioner pulley 26 over a selected range of tensions of the belt 20, ranging from a low tension of 100N to a high tension that is equal to a yield strength of the belt 20.

Similarly, an arcuate path P2 is shown for the second pulley 28. The arcuate path P2 represents the path of movement of the second tensioner pulley 28 over a selected range of tensions of the belt 20, ranging from a low tension of 100N to a high tension that is equal to a yield strength of the belt 20.

The paths P1 and P2 may, in a non-limiting example, each comprise an angular movement of between about 12 and about 15 degrees, about the pivot axes APA1 or APA2 as the case may be.

The first and second selected paths P1 and P2 are positioned such that, for any combination of tensions in the first and second spans 20a and 20b within the selected range of tensions noted above, the first tensioner pulley 26 and the second tensioner pulley 28 remain sufficiently spaced apart from one another that the first and second spans 20a and 20b of the endless drive member 20 remain spaced apart from one another. This is advantageous over many tensioners currently available for several reasons. In general, at least some tensioners of the prior art with two arms can collide during operation. There are several reasons for this. Due to a need to keep overall space consumption small due to the severe space restrictions that exist underhood for some vehicles, the pivot points for two pivoting tensioner arms of an MGU-mounted tensioner would be generally symmetrical and would hold symmetrical arms. To ensure that sufficient belt-wrap was achieved, however, the arms would have to be pivoted inwards towards each other as a starting position. However, tolerances in the belt length, in the positional relationships between the various components and the like, can result in the pulleys (and therefore the belt spans that they carry) being brought closer together than is desired as a starting position. During idling or other situations where vibrations can cause the tensioner arms to be positioned closer together than expected, the belt 20 has a risk of being damaged by engagement of the two belt spans 20a and 20b on either side of the MGU pulley 24a. Additionally, with the pivot axes sufficiently close to one another that the arms have a tendency to be angled in such a way as to not have good belt wrap. This can lead to an event called hooting, which can occur when the belt wrap is small while the belt tension is low, where the belt's movement on the pulley causes rotation of the pulley. However, the radial force on the outer race of the ball bearing that supports the pulley is so small that the outer race turns without achieving any rotation of the balls inside the bearing, between the outer and inner races, which can result in a noise that is referred to hooting as it can resemble a hooting sound.

By configuring one of the arms 30 or 32 (in the example shown, the arm 32) so that the pulley-pulley distance DPP1 or DPP2 for that arm (i.e. the distance between the pulley axis TPA1 or TPA2 and the MGU pulley axis APDA) is sufficiently smaller than that of the other arm 30 or 32, the paths P1 and P2 can extend in directions that result in higher belt wrap without risk of collision between the belt spans 20a and 20b.

Put another way, the first and second paths P1 and P2 are selected so as to be positioned such that, for any combination of tensions in the first and second spans 20a and 20b within the selected range of tensions the first tensioner pulley and the second tensioner pulley remain sufficiently spaced apart from one another that the first and second spans 20a and 20b of the endless drive member 20 remain spaced apart from one another.

In some embodiments, the first and second arm pivot structures are within an area of the end-face (shown at 70 in FIGS. 1 and 2) of the auxiliary power DPP2 to the first pulley-pulley distance DPP1 is between about 0.5 and about 0.85. It has been found that by configuring the arms 30 and 32 to have a length ratio that falls within this aforementioned range, will ensure that the tensioner 25 performs well while inhibiting belt slip during transient events such as a change-over to Boost mode from a Regen mode, or a changeover to a Regen mode from a Boost mode.

The first tensioner pulley axis TPA1 is at a first arm pivot distance DAP1 from the first arm pivot axis APA1. Similarly, the second tensioner pulley axis TPA2 is at a second arm pivot distance DAP2 from the second arm pivot axis APA2. In some embodiments, the first arm pivot distance DAP1 is greater than the second arm pivot distance DAP2.

Figure 6:
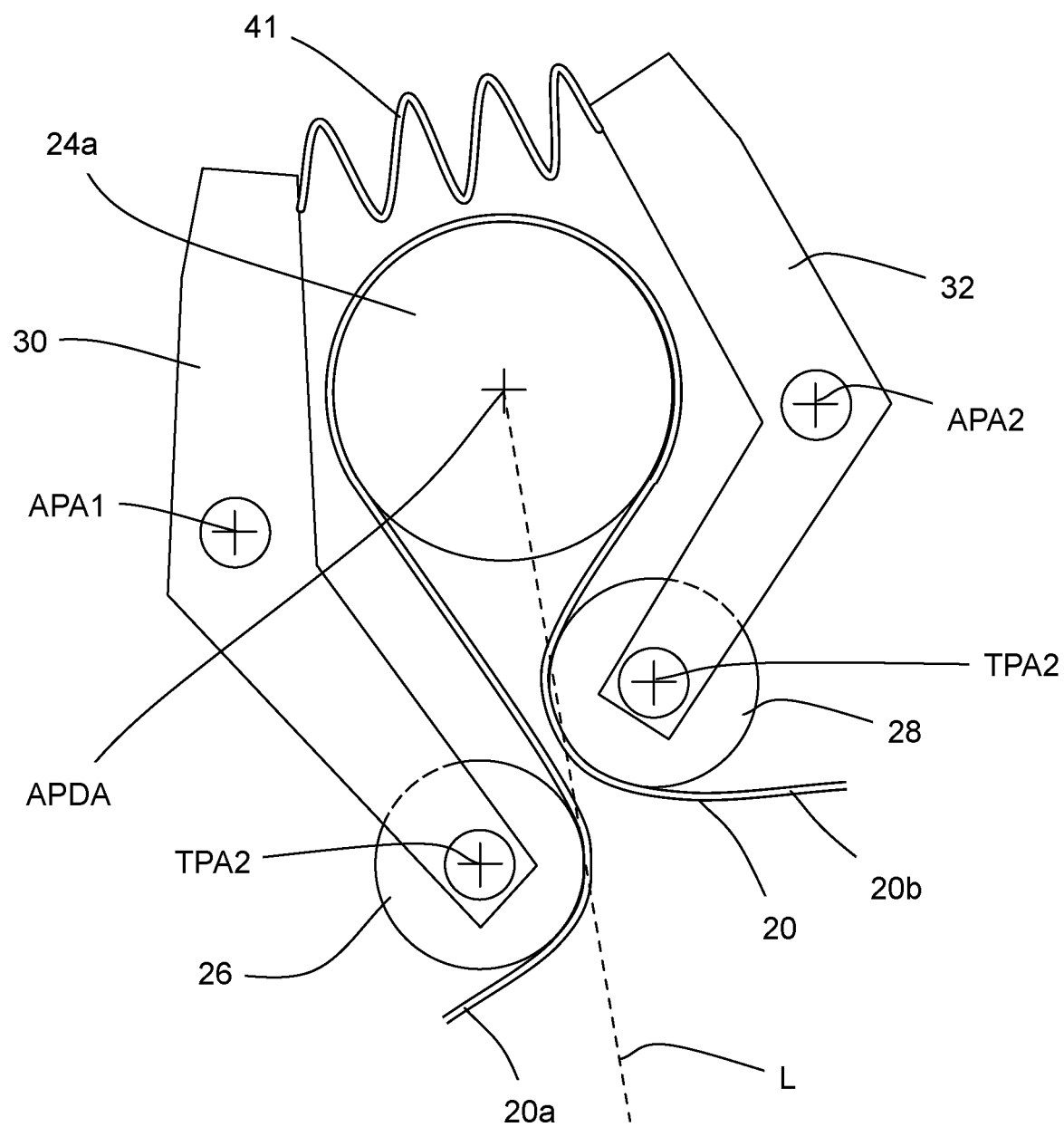
FIG. 6 is a plan view of yet another variant of the tensioner shown in FIG. 2.

In some embodiments, the first arm 30 and the second arm 32 are positionable during use to hold the first and second belt spans 20a and 20b in such a way that a radial line L (FIG. 6) extending from the auxiliary power device pulley axis APDA passes through the first and second belt spans 20a and 20b, and optionally through the first and second tensioner pulleys 26 and 28.

Second Tensioner Arm is Configured to Increase Belt Wrap Faster than First Tensioner Arm With continued reference to FIG. 5, it will be noted that one or both of the distances DPP2 and DAP2 for the second tensioner arm 32 may preferably be shorter than the corresponding distances DPP1 and DAP1 as the case may be. This is because of the differences in how the endless drive arrangement ramps up during a boost event relative to how it ramps up during an engine driven event. During a boost event (or similarly, during any event where the MGU 18a is driven as a motor to drive the belt 20 instead of or in addition to the engine 12), the first belt span 20a increases in tension while the second belt span 20b drops in tension. The change in tension on the belt spans 20a and 20b is relatively fast. In order to ensure that there is no belt slip, it is beneficial to increase the amount of belt wrap on the MGU pulley 24a relatively quickly, so that the increased amount of belt wrap at least partially offsets the reduced belt tension. By having a shorter pivot length the second arm 32 goes through a greater angular change for a given amount of linear movement at the pin joint with the biasing member 41. As a result, the second arm 32 swings inward towards the MGU pulley 24a by a relatively large amount, thereby increasing the belt wrap on the MGU pulley 24a by a relatively large amount. By contrast, during a changeover from the Boost mode to a Regen mode, in which the MGU 18a is either non-operational or is operated as an alternator, the first belt span 20a decreases in tension, while the second belt span 20b increases in tension. However, the rate of change in tension is generally slower than the rate of change in tension during a transition to the Boost mode. As a result, the slower angular movement that occurs with the first tensioner arm 30 due to its longer pivot distance DAP1 and its longer pulley-pulley distance DPP1 is acceptable for preventing belt slip.

By contrast, some tensioners of the prior art employ additional idlers in order to ensure that there is sufficient belt wrap on the MGU pulley to prevent belt slip during transient events. However, it is generally undesirable to add idlers to a belt system in a vehicle for a variety of reasons. Accordingly, it is preferable for a belt system to be able to transition as needed to ensure that belt slip does not occur by means of moving tensioner arms, as is the case for the tensioner 25 shown and described herein. Thus, the endless drive arrangement 10 shown herein preferably does not include any idler pulleys.

Method of Operation

In an aspect, a method of operating a tensioner such as the tensioner 25, is provided, comprising:

a) driving an endless drive member (e.g. belt 20) via an engine (e.g. engine 12) and operating an auxiliary power device (e.g. MGU 18a) in a regen mode via the endless drive member;

b) during step a), engaging a first span (e.g. span 20a) of the endless drive member on a first side of the auxiliary power device with a first tensioner arm (e.g. arm 30) of a tensioner (e.g. tensioner 25) and engaging a second span (e.g. span 20b) of the endless drive member on a second side of the auxiliary power device with a second tensioner arm (e.g. arm 32) of the tensioner, wherein the first and second tensioner arms are connected to a biasing structure (e.g. biasing member 41);

switching from the regen mode (FIG. 2) to a mode in which the endless drive member is driven at least partially using the auxiliary power device (as shown in FIG. 5); and d) during said switching in step c), moving the first and second tensioner arms, based on changes in tension in the first and second spans of the endless drive member, wherein the second tensioner arm is moved through a greater angular sweep than the first tensioner arm.

ALTERNATIVE EMBODIMENTS

The endless drive arrangement 10 is shown as having the MGU 18a, the crankshaft 14 and the air conditioning compressor, however, it will be appreciated by one skilled in the art that the endless drive arrangement 10 may have more or fewer components that are engaged with the belt 20. For example, the endless drive arrangement could be a 'two-pulley' system in which there is only the crankshaft pulley 16 and the MGU pulley 24a (and the tensioner 25).

Other components could be driven off of a second belt (not shown) that is driven by the crankshaft separately using a second crankshaft pulley.

While it has been shown for the tensioner pulleys 26 and 28 to hang from the tensioner arms 30 and 32 thereby facing the MGU 18a, it will be understood that, in some embodiments, one or both tensioner pulleys 26 and 28 may face away from the MGU 18a.

While the description contained herein constitutes a plurality of embodiments of the present invention, it will be appreciated that the present invention is susceptible to further modification and change without departing from the fair meaning of the accompanying claims.

The invention claimed is:

1. An endless drive arrangement, comprising:
a crankshaft pulley that is driveable by an engine;
an auxiliary power device, having an auxiliary power device pulley that is rotatable about an auxiliary power device pulley axis, wherein the auxiliary power device pulley is provided on an auxiliary power device drive shaft that extends from an end-face of the auxiliary power device, wherein the end-face is part of a frame for the auxiliary power device;
an endless drive member that extends about the crankshaft pulley and the auxiliary power device pulley; and
a tensioner that includes
a base that is mountable to a frame of an auxiliary power device having an auxiliary power device pulley that is rotatable about an auxiliary power device pulley axis;
a first arm having a first tensioner pulley, wherein the first arm is pivotally mounted to the base at a first arm pivot structure;
a second arm having a second tensioner pulley, wherein the second arm is pivotally mounted to the base at a second arm pivot structure; and
an arm biasing member operably connected to the first arm and the second arm;
wherein the first and second tensioner pulleys are positioned to engage first and second spans respectively of the endless drive member on first and second sides of the auxiliary power device pulley,
wherein the first span is at a lower tension than the second span when the auxiliary power device is not supplying power to the engine via the endless drive member and wherein the second span is at a lower tension than the first span when the auxiliary power device is supplying power to the engine via the endless drive member, and
wherein the first tensioner pulley and the second tensioner pulley are movable along a first selected path and a second selected path respectively, and the first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another,
wherein the first tensioner pulley axis is at a first arm pivot distance from a pivot axis of the first arm pivot structure, and wherein the second tensioner pulley axis is at a second arm pivot distance from a pivot axis of the second arm pivot structure, wherein the first arm pivot distance is greater than the second arm pivot distance.

2. An endless drive arrangement as claimed in claim 1, wherein the first and second pivot axes are at least 60 mm away from the auxiliary power device pulley axis.

3. An endless drive arrangement as claimed in claim 1, wherein the first tensioner pulley axis is spaced from the auxiliary power device pulley axis by a first pulley-pulley distance, and the second tensioner pulley axis is spaced from the auxiliary power device pulley axis by a second pulley-pulley distance,
wherein, substantially throughout movement along the first and second paths during operation, a ratio of the second pulley-pulley distance to the first pulley-pulley distance is between about 0.5 and about 0.85.

4. An endless drive arrangement as claimed in claim 1, wherein the arm biasing member is a helical compression spring.

5. An endless drive arrangement as claimed in claim 1, wherein the first and second spans are free of any idler pulleys.

6. An endless drive arrangement as claimed in claim 1, wherein the first arm and the second arm are positionable during use to hold the first and second spans in such a way that a radial line extending from the auxiliary power device pulley axis passes through the first and second spans.

7. An endless drive arrangement, comprising:
a crankshaft pulley that is driveable by an engine;
an auxiliary power device, having an auxiliary power device pulley that is rotatable about an auxiliary power device pulley axis, wherein the auxiliary power device pulley is provided on an auxiliary power device drive shaft that extends from an end-face of the auxiliary power device, wherein the end-face is part of a frame for the auxiliary power device;

an endless drive member that extends about the crankshaft pulley and the auxiliary power device pulley; and a tensioner that includes
- a base that is mountable to a frame of an auxiliary power device having an auxiliary power device pulley that is rotatable about an auxiliary power device pulley axis;
- a first arm having a first tensioner pulley, wherein the first arm is pivotally mounted to the base at a first arm pivot structure;
- a second arm having a second tensioner pulley, wherein the second arm is pivotally mounted to the base at a second arm pivot structure; and
- an arm biasing member operably connected to the first arm and the second arm;
- wherein the first and second tensioner pulleys are positioned to engage first and second spans respectively of the endless drive member on first and second sides of the auxiliary power device pulley, and
- wherein the first tensioner pulley and the second tensioner pulley are moveable along a first selected path and a second selected path respectively, and the first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another,
- wherein the first arm and the second arm are positionable during use to hold the first and second spans in such a way that a radial line extending from the auxiliary power device pulley axis passes through the first and second spans.

8. An endless drive arrangement as claimed in claim 7, wherein the first and second pivot axes are at least 60 mm away from the auxiliary power device pulley axis.

9. An endless drive arrangement as claimed in claim 7, wherein the first span is at a lower tension than the second span when the auxiliary power device is not supplying power to the engine via the endless drive member and wherein the second span is at a lower tension than the first span when the auxiliary power device is supplying power to the engine via the endless drive member.

10. An endless drive arrangement as claimed in claim 7, wherein the first tensioner pulley axis is at a first arm pivot distance from a pivot axis of the first arm pivot structure, and wherein the second tensioner pulley axis is at a second arm pivot distance from a pivot axis of the second arm pivot structure, wherein the first arm pivot distance is greater than the second arm pivot distance.

11. An endless drive arrangement as claimed in claim 7, wherein the first tensioner pulley axis is spaced from the auxiliary power device pulley axis by a first pulley-pulley distance, and the second tensioner pulley axis is spaced from the auxiliary power device pulley axis by a second pulley-pulley distance,
wherein, substantially throughout movement along the first and second paths during operation, a ratio of the second pulley-pulley distance to the first pulley-pulley distance is between about 0.5 and about 0.85.

12. An endless drive arrangement as claimed in claim 7, wherein the arm biasing member is a helical compression spring.

13. A tensioner for maintaining tension in an endless drive member that is drivable by an engine and that engages an auxiliary power device pulley that is mounted to an auxiliary power device drive shaft extending from a frame of an auxiliary power device, the tensioner comprising:
- a base that is mountable to the frame of an auxiliary power device;
- a first arm having a first tensioner pulley, wherein the first arm is pivotally mounted to the base at a first arm pivot structure;
- a second arm having a second tensioner pulley, wherein the second arm is pivotally mounted to the base at a second arm pivot structure; and
- an arm biasing member operably connected to the first arm and the second arm;
- wherein the first and second tensioner pulleys are positioned to engage first and second spans respectively of the endless drive member on first and second sides of the auxiliary power device pulley,
- wherein the first span is at a lower tension than the second span when the auxiliary power device is not supplying power to the engine via the endless drive member and wherein the second span is at a lower tension than the first span when the auxiliary power device is supplying power to the engine via the endless drive member, and
- wherein the first tensioner pulley and the second tensioner pulley are moveable along a first selected path and a second selected path respectively, and the first and second selected paths are positioned such that, for any combination of tensions in the first and second spans within the selected range of tensions the first tensioner pulley and the second tensioner pulley remain sufficiently spaced apart from one another that the first and second spans of the endless drive member remain spaced apart from one another,
- wherein the first tensioner pulley axis is at a first arm pivot distance from a pivot axis of the first arm pivot structure, and wherein the second tensioner pulley axis is at a second arm pivot distance from a pivot axis of the second arm pivot structure, wherein the first arm pivot distance is greater than the second arm pivot distance.

\* \* \* \* \*